(12) United States Patent
Michel et al.

(10) Patent No.: US 7,859,689 B2
(45) Date of Patent: Dec. 28, 2010

(54) METHODS AND APPARATUS FOR ANALYZING ELECTRONIC DOCUMENTS AND DIGITAL PRINTING SYSTEMS

(75) Inventors: Paul Michel, Redwood City, CA (US); Jonathan Marsden, San Mateo, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 1453 days.

(21) Appl. No.: 10/631,115

(22) Filed: Jul. 31, 2003

(65) Prior Publication Data

US 2005/0028093 A1 Feb. 3, 2005

(51) Int. Cl.
| | |
|---|---|
| G06F 3/12 | (2006.01) |
| G06F 17/28 | (2006.01) |
| G06F 3/00 | (2006.01) |
| G06F 3/16 | (2006.01) |
| H04N 1/60 | (2006.01) |
| H04N 1/46 | (2006.01) |
| G06K 15/00 | (2006.01) |

(52) U.S. Cl. .................. 358/1.13; 358/1.9; 358/2.1; 358/517; 358/518; 358/1.15; 715/275; 715/255; 715/716; 715/727; 715/728

(58) Field of Classification Search .................. None
See application file for complete search history.

(56) References Cited

U.S. PATENT DOCUMENTS

| | | | | |
|---|---|---|---|---|
| 5,257,097 A * | 10/1993 | Pineau et al. | ............ | 358/500 |
| 5,402,527 A * | 3/1995 | Bigby et al. | ............ | 358/1.1 |
| 5,594,860 A * | 1/1997 | Gauthier | ............ | 345/543 |
| 5,606,649 A * | 2/1997 | Tai | ............ | 358/1.11 |
| 5,710,577 A * | 1/1998 | Laumeyer | ............ | 345/548 |
| 5,898,821 A * | 4/1999 | Brandkamp | ............ | 358/3.06 |
| 5,923,013 A * | 7/1999 | Suzuki et al. | ............ | 235/375 |
| 6,059,469 A * | 5/2000 | Hirumi | ............ | 400/208 |
| 6,469,805 B1 * | 10/2002 | Behlok | ............ | 358/1.9 |
| 6,525,831 B1 * | 2/2003 | Evans, IV | ............ | 358/1.15 |
| 6,600,569 B1 * | 7/2003 | Osada et al. | ............ | 358/1.12 |
| 6,823,147 B2 * | 11/2004 | Jackelen et al. | ............ | 399/16 |
| 6,934,047 B2 * | 8/2005 | Housel | ............ | 358/1.15 |
| 6,959,416 B2 * | 10/2005 | Manning et al. | ............ | 715/227 |
| 7,023,568 B2 * | 4/2006 | Tsunekawa | ............ | 358/1.13 |
| 7,511,853 B2 * | 3/2009 | Nakami | ............ | 358/1.9 |
| 2002/0089689 A1 * | 7/2002 | Ferlitsch et al. | ............ | 358/1.15 |
| 2003/0053810 A1 * | 3/2003 | Jackelen et al. | ............ | 399/16 |
| 2004/0196494 A1 * | 10/2004 | Binder | ............ | 358/1.15 |

OTHER PUBLICATIONS

Courtney E. Howard, "Preflight Beyond Print," Electronic Publishing, Jun. 2003, 26-31.
PCT/US2004/21700 Int'l Search Report and Written Opinion from Counterpart WO Case, Jan. 12, 2006, Michel et al.

* cited by examiner

Primary Examiner—Edward L Coles
Assistant Examiner—Hilina S Kassa
(74) Attorney, Agent, or Firm—Glenn Patent Group; Michael A. Glenn

(57) ABSTRACT

Methods and apparatus are provided for receiving a PDL File that describes a print job, processing the PDL commands in the file, identifying print settings and printer factors that may affect the entire print job, and reporting such print settings and printer factors. Methods and apparatus are also provided for receiving a PDL File that describes a print job, processing the PDL commands in the file, identifying any objects in the print job that have associated predetermined attributes, and reporting the print objects that have any such predetermined attributes.

4 Claims, 9 Drawing Sheets

| PREDETERMINED ATTRIBUTE | ASSOCIATED MARKER |
|---|---|
| font name = Helvetica | replace color values with shades of cyan |
| font name = Arial and font size = 18 pt | replace color values with shades of magenta |
| color space = RGB | replace color values with shades of yellow |
| object = graphic and color value = Pantone 117 | tag object with text "SPOT" |
| ⋮ | ⋮ |
| object = graphic and orientation = landscape | invert color values |

FIG. 6A

| PREDETERMINED ATTRIBUTE | ASSOCIATED MARKER |
|---|---|
| font name = Helvetica | report page number and location in yellow text |
| font name = Arial and font size = 18 pt | report page number and location in magenta text |
| color space = RGB | report page number and location in cyan + yellow text |
| object = graphic and color value = Pantone spot | report page number and location in spot colored text |
| ⋮ | ⋮ |
| object = graphic and orientation = landscape | report page number and location in cyan + magenta text |

FIG. 6B

| Object | Attribute(s) |
|---|---|
| Text 102 | font name = Helvetica<br>font size = 12 pt.<br>color space = CMYK (device dependent) |
| Image 104 | color space = RGB (device independent)<br>orientation = portrait |
| Image 106 | color space = CMYK (calibrated CMYK)<br>orientation = portrait |
| Text 108 | font name = Arial<br>font size = 18 pt.<br>color space = CMYK (device dependent) |
| Graphic 110 | color value = Pantone 117<br>orientation = portrait<br>color space = Spot |
| Graphic 112 | color value = (C1,M1,Y1,K1)<br>orientation = portrait<br>color space = CMYK (calibrated CMYK) |
| Graphic 114 | color value = (C2,M2,Y2,K2)<br>orientation = landscape<br>color space = CMYK (device dependent) |

FIG. 9

METHODS AND APPARATUS FOR ANALYZING ELECTRONIC DOCUMENTS AND DIGITAL PRINTING SYSTEMS

FIELD OF THE INVENTION

This invention relates to digital printing. In particular, this invention relates to methods and apparatus for analyzing the characteristics of an electronic document after interpreting page description language commands that describe the document. This invention also relates to methods and apparatus for analyzing the performance of digital printing systems.

BACKGROUND

Referring to FIG. 1, a conventional digital printing workflow is described. At step 10, a user creates or edits a source file using either a software application, such as a word processor, spreadsheet, presentation program, page layout tool, digital image processing program or other similar software program, or a digital device, such as a digital camera, copier, facsimile machine, scanner or other similar digital devices. A source file may include text, images, and graphics, and also may include formatting codes, font characteristics, and other similar elements. For example, a source file created in a word processing program (e.g., Microsoft® Word) may include text along with an embedded image that was created by a photo processing program (e.g., Adobe® Photoshop®), and an embedded graphic created by a spreadsheet program (e.g., Microsoft Excel). Once the source file has been created or edited, the user may want to print the document on a specific output device.

At step 12, prior to printing the source file, the user optionally may analyze the file to determine if the specific output device can print the file. Typically, the user can perform this analysis using any conventional "preflight" software program that compares the data in the source file to a set of rules, often called a "preflight profile," associated with the specified output device. For example, a preflight profile for a particular printer may include a set of parameters listing the native fonts installed on the printer, the resolution range of the printer, and other printer parameters. If the source file includes text in a font that is not installed on the specified printer, the preflight program may report that the file may not be printed unless the font is provided to the printer as part of the print job. Similarly, if the source file includes an image that is at a resolution that is not within the printer's resolution range, the preflight program may report that the file may not be printed unless the image is converted from the specified resolution to a resolution within the printer's acceptable range. Based on the results of the preflight report, the user may return to step 10 to edit the source file, such as including a font description or modifying the resolution of an image.

Next, at step 14, the source file is translated to a page description format, such as PostScript, PDF, page command language (PCL), or any other programming language or page description language (collectively referred to herein as "PDL") that can be recognized by an output device or processing device. A PDL file or PDL stream (collectively referred to herein as a "PDL File") typically includes commands that describe, among other things, printer settings and print objects (e.g., pages, text, images and graphics) included in the print job. This translation step commonly occurs when a user selects a "Print" function within a source application program, which calls a printer driver that translates the source file to a PDL File. Alternatively, a user may submit the source file to some other type of software application (e.g., a distiller program), which then generates the PDL File. In either event, the printer driver or distiller program typically allows the user to specify various print options for the print job. Print options typically include many parameters that affect the appearance of the printed output, such as color mode, brightness, RGB source profile, RGB separation, CMYK source profile, output (device) profile, special black handling, spot color support, and other print options.

After the user selects the desired print options, the printer driver or distiller generates a PDL File that describes the print job. At step 16, the user optionally may analyze the PDL File using a preflight program to verify that the specified output device can print the file. Based on the results of the preflight report, the user may return to step 10 to edit the source file. Otherwise, at step 18, a raster image processor ("RIP") interprets the commands included in the PDL File, and generates a raster description of the print job. At step 20, the specified printer receives the raster data and prints the print job.

One common problem with such previously known digital printing workflows is that final printed output may not appear as the user intended. Indeed, although preflight programs help to ensure that a digital document may be printed by a specified printer, such programs do not necessarily ensure that the digital document will be correctly printed by the printer. Thus, even though a user receives one or more clean preflight reports, the printed document nevertheless may have printing problems, such as unacceptable moiré, incorrect colors, or other printing problems. Such problems often occur because data in the source file and PDL File may be modified during the various processing steps in the digital printing workflow, sometimes without the user ever knowing that such conversions are occurring.

For example, if a user creates a source file in Microsoft Word, and imports into the document an image object that was described in a Cyan, Magenta, Yellow, Black ("CMYK") color space, Word typically converts the image object to a Red, Green Blue ("RGB") color space without the user knowing that such a conversion is occurring. Further, when the user generates the PDL File (e.g., via a printer driver, distiller, or other application) this conversion process may also convert color spaces of objects, add definitions that affect objects, tag objects with a name of a color space (not necessarily the correct color space), or make other changes that may affect a printed output based on the PDL File. Previously known preflight programs may not detect such changes, some of which may only affect the print job when the RIP interprets the commands in the PDL File.

In addition, a print job may print incorrectly because the user incorrectly specified print options when submitting the print job via the printer driver or distiller. Many users do not know the meaning of the various print options, and may not know how to select the options that are required to correctly print their print job. Indeed, some users may simply select default values for all print options, or may guess the values for the options. If the printed output does not print correctly, the user may modify the print options, in hopes that some combination of print options may result in a correctly printed output. Such trial and error approaches are time consuming and costly, and may be completely ineffective. Indeed, in some cases, a user may modify print options to change the appearance of an image on one page of the document, and in doing so may unwittingly change the appearance of a graphic that had been printing correctly on another page of the document. The user may give up in frustration without ever obtaining a correctly printed document.

Moreover, some printer options and factors affect only some objects in a print job, whereas other options and factors affect the entire print job. For example, a user may have specified a default output profile that is suitable for use with conventional paper stock, but may actually be printing a print job on transparency media, which requires an output profile designed for such media. Similarly, a user may have selected a halftone screen that is suitable for print jobs that include text objects, but may actually be printing a print job that consists entirely of images, for which a different halftone screen is more appropriate. In addition, if a long time has elapsed since the printer was last calibrated, a print job may print incorrectly. In general, preflight programs assume that the printer will operate in its ideal state. Preflight programs cannot check for errors in global print settings and printer factors that affect the entire print job if these factors and settings are not defined in the PDL File (e.g., a low density in one of the printer's colorants).

In view of the foregoing, it would be desirable to provide methods and apparatus to help detect problems in a print job.

It also would be desirable to provide methods and apparatus to help correct problems in a print job.

It further would be desirable to provide methods and apparatus to help specify print options for a print job.

It additionally would be desirable to provide methods and apparatus for analyzing the characteristics of an electronic document after interpreting page description language commands that describe the document.

It also would be desirable to provide methods and apparatus for analyzing global print settings and printer factors that affect an entire print job.

SUMMARY

In view of the foregoing, it is an object of this invention to provide methods and apparatus to help detect problems in a print job.

It also is an object of this invention to provide methods and apparatus to help correct problems in a print job.

It further is an object of this invention to provide methods and apparatus to help specify print options for a print job.

It additionally is an object of this invention to provide methods and apparatus for analyzing the characteristics of an electronic document after interpreting page description language commands that describe the document.

It also is an object of this invention to provide methods and apparatus for analyzing global print settings and printer factors that affect an entire print job.

These and other objects of this invention are accomplished by providing methods and apparatus for receiving a PDL File that describes a print job, processing the PDL commands in the file, identifying print settings and printer factors that may affect the entire print job, and reporting such print settings and printer factors. In addition, or alternatively, the present invention provides methods and apparatus for receiving a PDL File that describes a print job, processing the PDL commands in the file, identifying any objects in the print job that have associated predetermined attributes, and reporting the print objects that have any such predetermined attributes.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which:

FIG. 6A is a table including the exemplary list of predetermined attributes of FIG. 5 and exemplary associated markers for use with this invention;

FIG. 6B is a table including the exemplary list of predetermined attributes of FIG. 5 and alternative exemplary associated markers for use with this invention;

FIG. 9 is a table listing objects and associated attributes included in the print job of FIG. 8.

DETAILED DESCRIPTION

The present invention provides methods and apparatus for receiving a PDL File that describes a print job, processing the PDL commands in the file, identifying print settings and printer factors that may affect the entire print job, and reporting such print settings and printer factors. In addition, or alternatively, the present invention provides methods and apparatus for receiving a PDL File that describes a print job, processing the PDL commands in the file, identifying any objects in the print job that have associated predetermined attributes, and reporting the print objects that have any such predetermined attributes.

Figure 1:
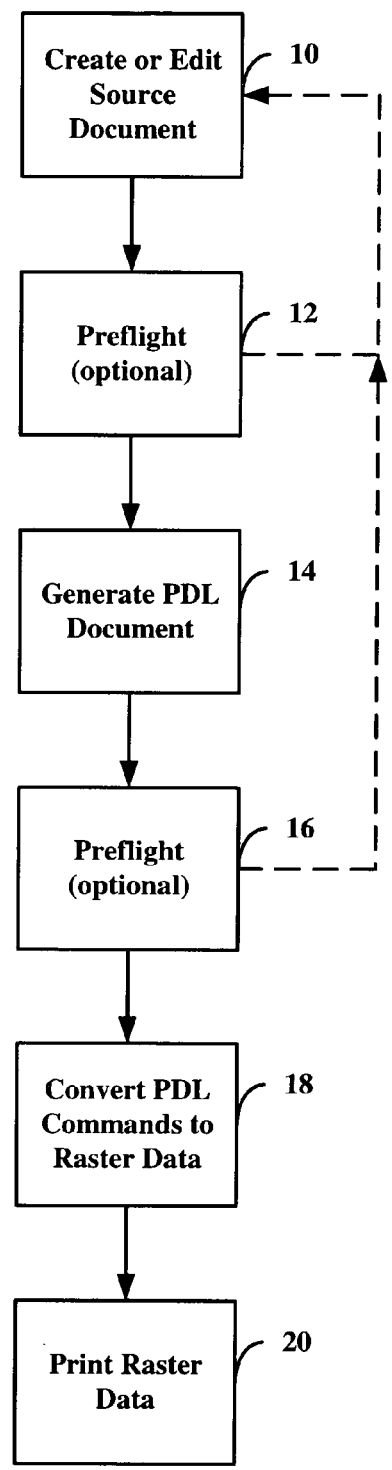
FIG. 1 is a block diagram of a previously known print workflow.
Figure 2:
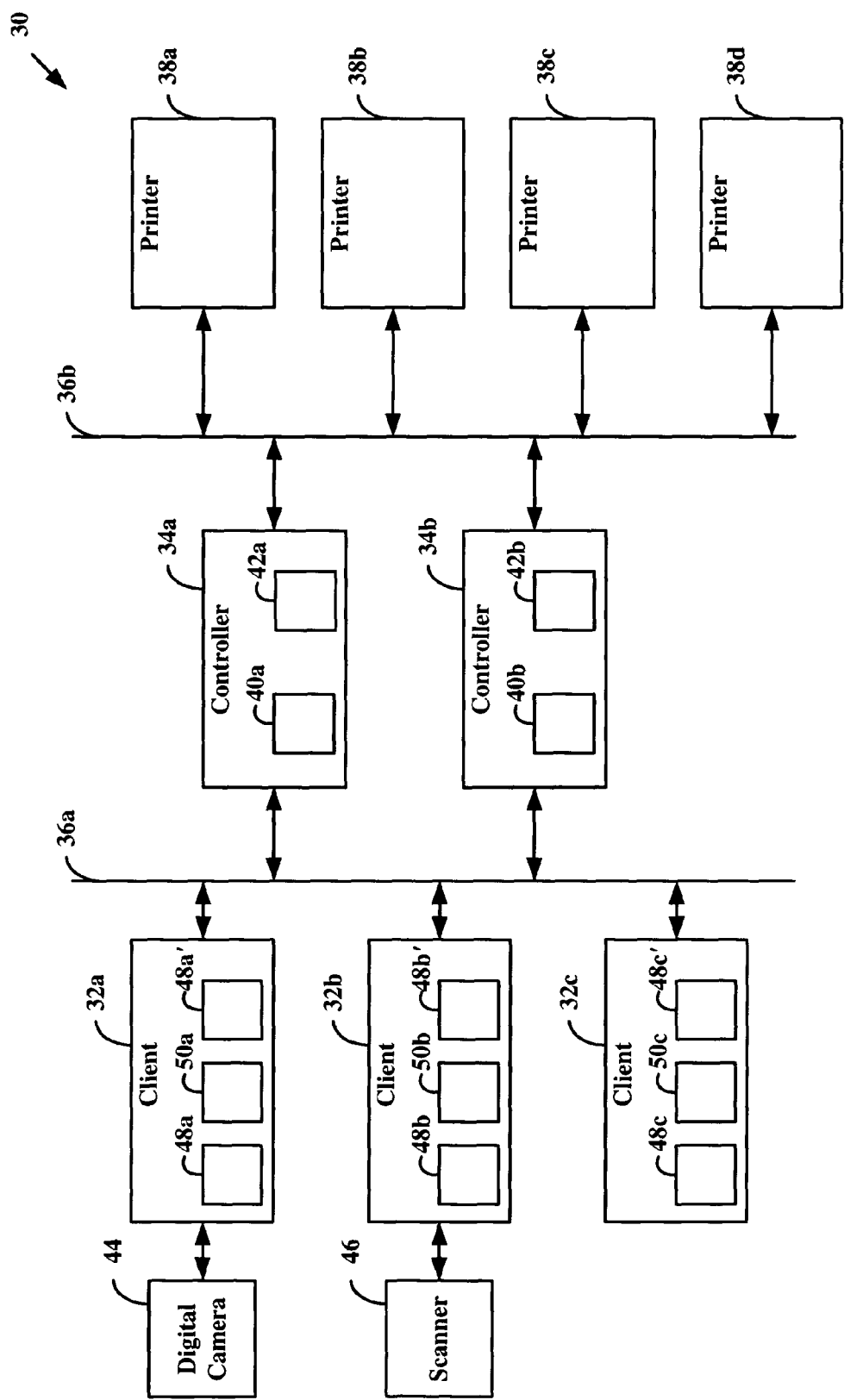
FIG. 2 is a block diagram of exemplary apparatus in accordance with this invention.

Referring now to FIG. 2, an exemplary printing system in accordance with this invention is described. Printing system 30 includes client computers 32a-32c coupled via network 36a to printer controllers 34a and 34b, which in turn are coupled via network 36b to printers 38a-38d. Client computers 32a-32c may be personal computers, laptop computers, handheld computers, personal digital assistants, cellular phones, or any other similar computing device that may be used to create and/or store source documents for printing. Client computers 32a-32c may be the same make and model computing device, or may be different computing devices. For example, client computer 32a may be a desktop personal computer, client computer 32b may be a laptop computer, and client computer 32c may be a web-enabled cellular telephone. Network 36a may be any conventional computer network, such as a wired network, wireless network, satellite network, local area network, wide area network, the Internet, Ethernet, or any similar network or combination thereof. Printing system 30 may include more than or less than three client computers 32a-32c.

Each of printer controllers 34a and 34b may be any conventional printer controller used to receive print jobs in a PDL format and provide rasterized data for printing by one or more of printers 38a-38d. In particular, printer controllers 34a and 34b may include RIPs 40a and 40b, respectively, which may be any conventional hardware, software, or combination hardware and software RIP that interprets PDL commands and provides rasterized output data. Printer controllers 34a and 34b may be the same make and model of printer controller, or may be different controllers. One or more of printer controllers 34a and 34b may be an external controller (i.e., physically separate from printers 38a-38d), or may be an internal controller (i.e., included in a corresponding one of printers 38a-38d). For example, printer controller 34a may be an internal controller coupled to printer 38a, and printer controller 34b may be an external controller coupled to printers 38b, 38c and 38d. Printing system 30 may include more than or less than two printer controllers 34a and 34b.

Each of printer controllers 34a and 34b may be coupled via network 36b to printers 38a-38d. Network 36b may be any conventional computer network, such as a wired network, wireless network, satellite network, local area network, wide area network, the Internet, Ethernet, or any similar network or combination thereof. As described in more detail below, printer controllers 34a and 34b may include software 42a and 42b, respectively, for implementing methods in accordance with this invention. Networks 36a and 36b may be the same network, or they may be different networks. Printers 38a-38d may be any conventional printers, such as a color printer, black and white printer, inkjet printer, dye sublimation printer, laser printer, copier, plotter, facsimile machine, or any other similar printer. Printers 38a-38d may be the same make and model of printer, or may be different printers. For example, printer 38a may be an inkjet printer, printer 38b may be a black and white laser printer, printer 38c may be a networked color copier, and printer 38d may be a wide format color printer. Printing system 30 may include more than or less than four printers 38a-38d.

Client computers 32a-32c optionally may be coupled to one or more digital image input devices, such as digital camera 44, scanner 46 or other digital image input device. Client computers 32a-32c may include one or more source files 48a-48c, respectively, printer drivers or distiller programs 50a-50c, respectively, and PDL files 48a'-48c', respectively. Each of source files 48a-48c may be created using any conventional software program for creating or displaying printable documents, such as a word processor, spreadsheet, presentation program, page layout program, photo editing application, Internet browser, or any similar program or combination thereof.

For example, source file 48a may be a document created using a word processor program (e.g., Microsoft Word) that includes an image created in a photo editing application (e.g., Adobe Photoshop). Source file 48b may be a document created in a presentation program (e.g., Microsoft PowerPoint) that includes a graph created in a spreadsheet (e.g., Microsoft Excel). Source file 48c may be a digital image that was scanned using scanner software (e.g., ScanSoft PaperPort), and then edited using a graphics design program (e.g., CorelDraw Graphics Suite). Printer drivers or distiller programs 50a-50c may be any conventional printer drivers or distiller programs for use with printer controllers 34a and 34b and printers 38a-38d. PDL Files 48a'-48c', may be any conventional PDL Files translated from source files 48a-48c, respectively, by printer drivers or distiller programs 50a-50c, respectively.

As described above, printer controllers 34a and 34b may include software 42a and 42b, respectively, for implementing methods for processing PDL Files in accordance with this invention. Referring now to FIG. 3A, a first exemplary method is described. At step 52, printer controller 34a receives PDL File 48a' from client computer 32a. PDL File 48a' may include PDL commands that describe printer settings and print objects (e.g., pages, text, images and graphics) included in the print job. At step 54, printer controller 34a begins interpreting the PDL commands in file 48a'. At step 56a, printer controller 34a identifies and reports global print settings and printer factors that may affect the entire print job.

For example, printer controller 34a may process a PDL command that specifies the halftone screen or output profile that shall be used to process the print job. Also, printer controller 34a may retrieve data describing the date and time that a specified printer, such as printer 38a, was last calibrated. Such data may be stored in memory, for example, in printer 38a or printer controller 34a. Printer controller 34a may report such global printer settings and printer factors in any conventional manner. For example, printer controller 34a may cause printer 38a to print a report that specifies the global printer settings and printer factors. Alternatively, printer controller 34a may transmit data for display by client computer 32a that specifies the global printer settings and printer factors.

Persons of ordinary skill in the art will understand that other techniques may be used to report the nature or status of global printer settings and printer factors. For example, in optional step 58, a PDL File having known characteristics (i.e., a "golden" PDL File) may be provided to printer controller 34a for printing on printer 38a. The golden PDL File may include objects that should print in a certain way if the printer is functioning properly and global print settings are properly specified. A user may print the golden PDL File to provide a visual indication of whether the printer is functioning properly and global print setting are properly specified.

Figure 3B:
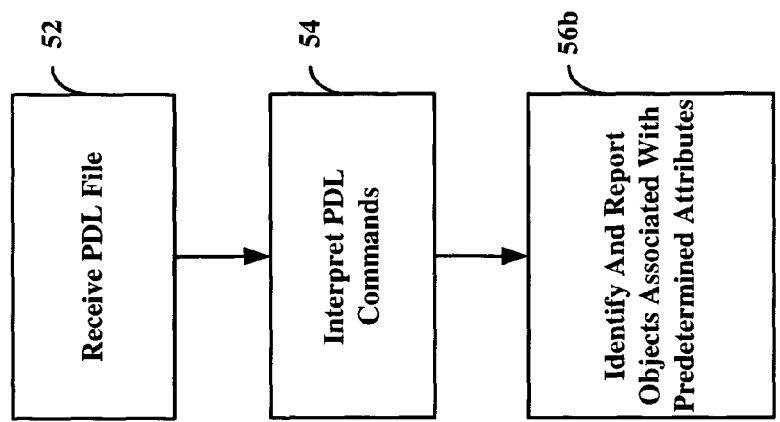
FIG. 3B is a block diagram of an exemplary method of analyzing a print job in accordance with this invention.
Figure 3A:
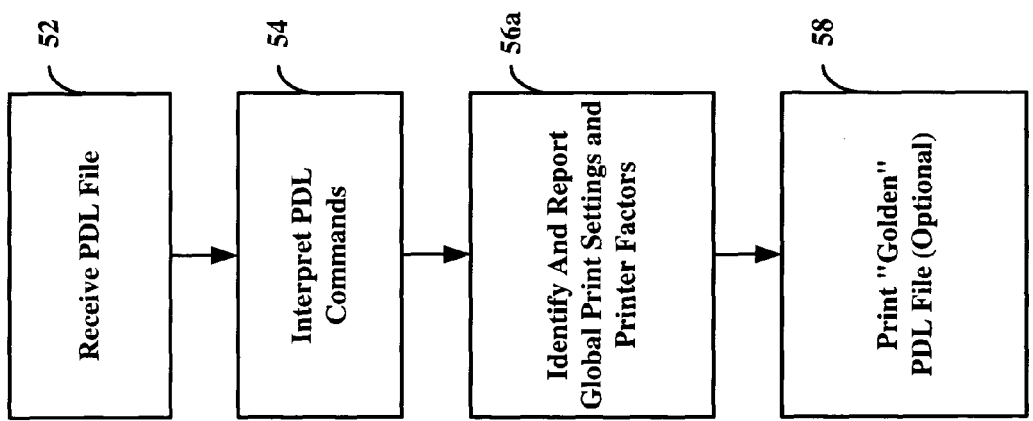
FIG. 3A is a block diagram of an exemplary method of analyzing global print settings and printer factors in accordance with this invention.
Figure 4:
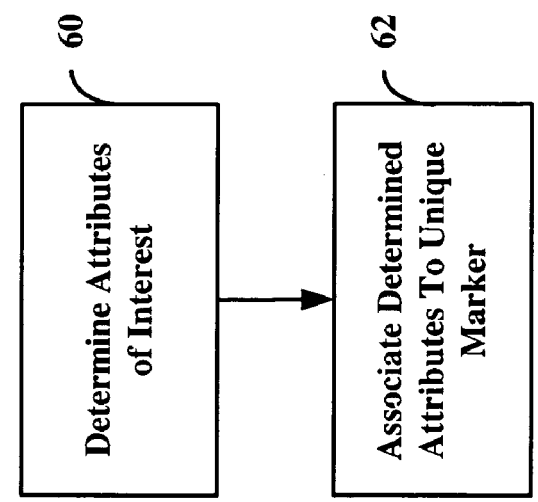
FIG. 4 is block diagram of an exemplary method of determining and marking attributes of interest in accordance with this invention.

Referring now to FIG. 3B, a second exemplary method for processing PDL Files in accordance with this invention is described. Steps 52 and 54 proceed as described above in connection with FIG. 3B. At step 56b, printer controller 34a identifies and reports any print objects in the print job that have attributes that match predetermined print object attributes. Referring now to FIG. 4, an exemplary method for predetermining such print object attributes in accordance with this invention is described. As described above, PDL File 48a' may include PDL commands that describe print objects (e.g., pages, text, images and graphics) included in the print job. Each print object has one or more associated attributes. For text objects, exemplary attributes include font name, font size, color space, color value, location, orientation, and other similar attributes. For image objects exemplary attributes include color space, location, orientation, and other similar attributes. For graphics objects, exemplary attributes include color space, color value, location, orientation, and other similar attributes. Beginning at step 60, one or more print object attributes are determined that are of interest in a particular print job.

Figure 5:
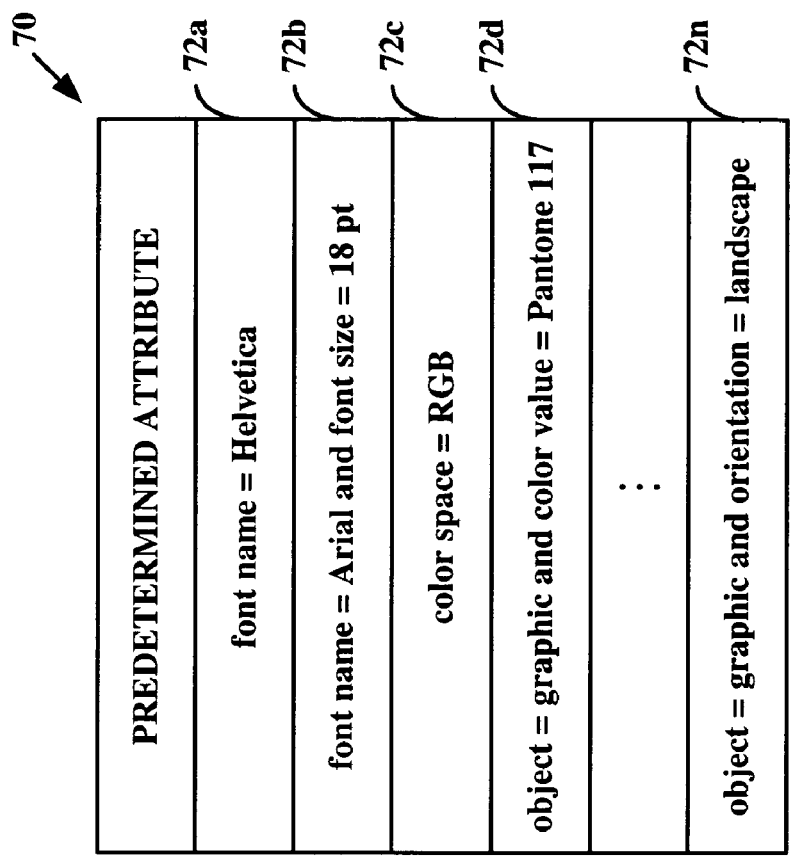
FIG. 5 is an exemplary list of predetermined attributes for use with the present invention.

FIG. 5 illustrates a table 70 listing exemplary predetermined print object attributes 72a-72n. Attribute 72a may be used to identify all text that is specified in Helvetica font, attribute 72b may be used to identify all text that is specified in Arial 18 point font, attribute 72c may be used to identify all objects (text, images, graphics) that are defined in an RGB color space, attribute 72d may be used to identify all graphics that have Pantone® 117 spot color values, and attribute 72n may be used to identify all graphics objects that have a landscape orientation. Persons of ordinary skill in the relevant art will understand that the examples listed are for illustrative purposes only, and that other attributes may be defined, and that more than or less than the number of attributes shown in FIG. 5 may be used.

Referring again to FIG. 4, after print object attributes have been determined, at step 62 a corresponding unique marker is assigned to each predetermined attribute. The unique marker may be any type of identification that may be used to identify the presence of an object associated with a predetermined attribute in the print job. Referring to FIGS. 6A and 6B, two exemplary sets of unique markers associated with the exemplary attributes in FIG. 5 are described. As shown in FIG. 6A, attribute 72*a* (font name=Helvetica) is associated with unique marker 74*a* (replace color values with shades of cyan), attribute 72*b* (font name=Arial and font size=18 pt) is associated with unique marker 74*b* (replace color values with shades of magenta), attribute 72*c* (color space=RGB) is associated with unique marker 74*c* (replace color values with shades of yellow), attribute 72*d* (object=graphic and color value=Pantone 117) is associated with unique marker 74*d* (tag object with text "SPOT") and attribute 72*n* (object=graphic and orientation=landscape) is associated with unique marker 74*n* (invert color values).

Alternatively, as shown in FIG. 6B attribute 72*a* (font name=Helvetica) is associated with unique marker 74*a*' (report page number and location in yellow text), attribute 72*b* (font name=Arial and font size=18 pt) is associated with unique marker 74*b*' (report page number and location in magenta text), attribute 72*c* (color space=RGB) is associated with unique marker 74*c*' (report page number and location in cyan+yellow text), attribute 72*d* (object=graphic and color value=Pantone 117) is associated with unique marker 74*d*' (report page number and location in spot colored text) and attribute 72*n* (object=graphic and orientation=landscape) is associated with unique marker 74*n*' (report page number and location in cyan+magenta text). The examples shown in FIGS. 6A and 6B are for illustrative purposes only, and other similar techniques may be used to associate unique markers to the defined print object attributes. For example, each identified attribute may be uniquely associated with a corresponding audio clip, such as a spoken phrase, musical note, bell, whistle, or other similar marker.

Figure 7:
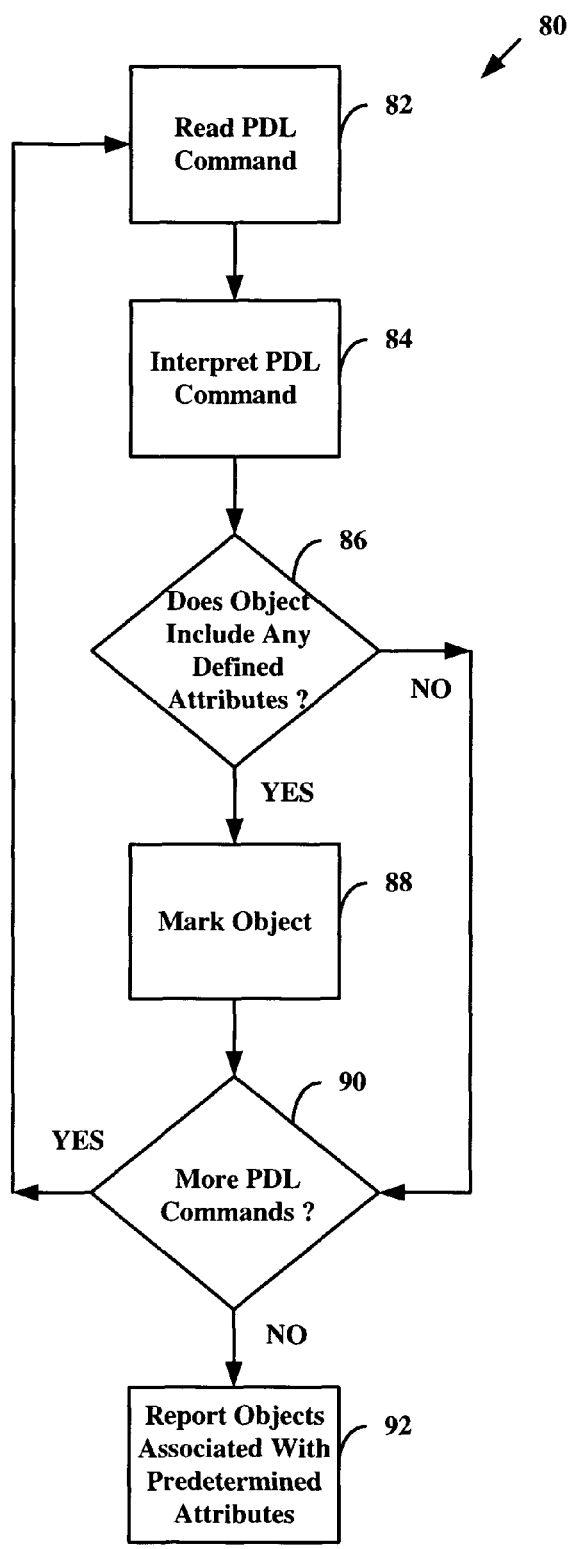
FIG. 7 is a block diagram of an exemplary method of analyzing a print job in accordance with this invention.

Referring now to FIG. 7, an exemplary method in accordance with this invention for interpreting PDL commands and for identifying print objects having attributes that match the predetermined attributes is described. Exemplary process 80 begins at step 82, in which printer controller 34*a* reads a PDL command in PDL File 48*a*'. At step 84, printer controller 34*a* interprets the PDL command. For example, the command may instruct printer controller 34*a* to draw a graphic object having a specific size, shape and set of color values at a specific location and orientation. At step 86, the attributes of the object processed in step 84 are checked to determine if any attribute matches the predetermined attributes. If the result of the query is NO, the processing proceeds to step 90. If the result of the query is YES, however, the object is marked at step 88 using the marker associated with the matched attribute. Processing then proceeds to step 90, where a query determines if PDL File 48*a*' includes any more PDL commands. If the result of the query is NO, processing proceeds to step 92, at which any objects associated with matching attributes are reported.

Printer controller 34*a* may report marked objects in any conventional manner. For example, printer controller 34*a* may cause printer 38*a* to print the print job including the affects of any associated markers. Thus, if the marking scheme of FIG. 6A is used, printer 38*a* will print the print job as follows: any text in Helvetica font will be printed in shades of cyan (regardless of font size), any text in Arial 18 point font will be printed in shades of magenta, any text, images and graphics defined in an RGB color space (device dependent or device independent) will be printed in shades of yellow, any graphics having a color value of Pantone 117 will be tagged with the text "SPOT," and any image or graphics having a landscape orientation will be printed in inverted colors. Persons of ordinary skill in the art will understand that other techniques may be used to report the marked objects. For example, printer controller 34*a* could display the print job including the affects of any associated markers on a display device, such as cathode ray tube, liquid crystal display, plasma display or other similar display device. The display device could be a display device included in client computer 32*a*, or any other display device coupled to printer controller 34*a*.

Figure 8:
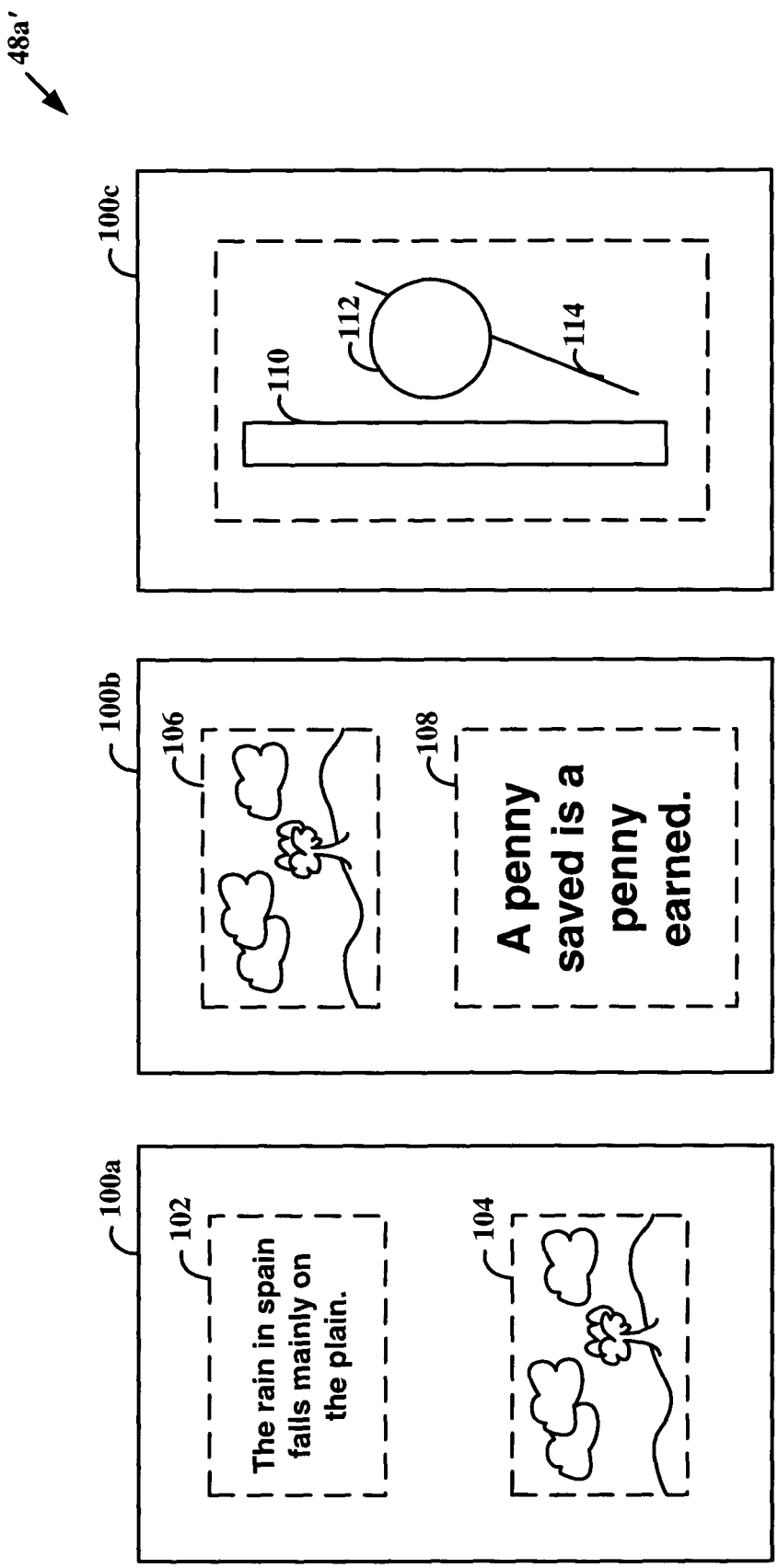
FIG. 8 is an exemplary print job for use with this invention.

Referring now to FIG. 8, an exemplary PDL File that may be processed using methods and apparatus in accordance with this invention is described. PDL File 48*a*' includes objects that define pages 100*a*-100*c*. Page 100*a* includes text 102 and image 104, page 100*b* includes image 106 and text 108, and page 100*c* includes graphics 110, 112 and 114. FIG. 9 illustrates a table summarizing the objects described in PDL File 48*a*' and each object's associated attributes. Text 102 has associated attributes: font name=Helvetica, font size=12 point and color space=CMYK (device dependent). Image 104 has the associated attributes: color space=RGB (device independent) and orientation=portrait. Image 106 is identical to image 104, but has the associated attributes: color space=CMYK (calibrated CMYK) and orientation=portrait. Text 108 has associated attributes: font name=Arial, font size=18 point and color space=CMYK (device dependent). Graphic 110 has associated attributes: color value=Pantone 117, orientation=portrait and color space=spot. Graphic 112 has associated attributes: color value=C1, M1, Y1, K1, orientation=portrait, and color space=CMYK (calibrated CMYK). Graphic 114 has associated attributes: color value=C2, M2, Y2, K2, orientation=landscape, and color space=CMYK (device dependent).

Figure 10:
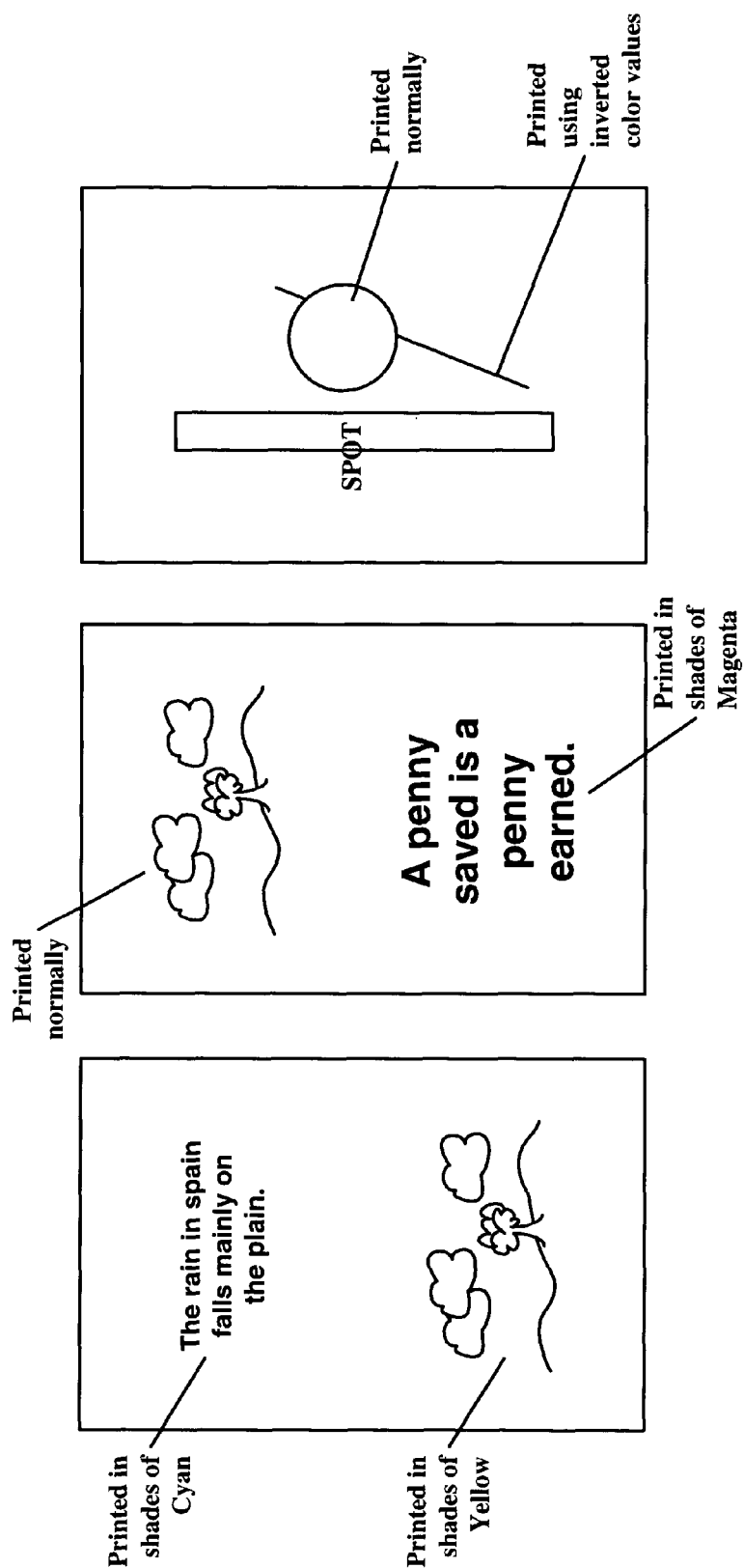
FIG. 10 is an exemplary report of the analysis of the print job of FIG. 8 in accordance with this invention.

If the marking scheme of FIG. 6A is used during processing of this exemplary PDL File, printer 38*a* will print the print job as shown in FIG. 10. In particular, text 102 is printed in shades of Cyan, image 104 is printed in shades of Yellow, image 106 is printed normally, text 108 is printed in shades of magenta, graphic 110 is printed with the tag "SPOT," graphic 112 is printed normally, and graphic 114 is printed using inverted color values. Thus, if a user knows the marking scheme that was used to process the print job, the printed document may be used to easily and visually determine the attributes of each object in the print job.

If the marking scheme of FIG. 6B is used during processing of the exemplary PDL File of FIG. 8, printer 38*a* will print a report that specifies the page number and location of each object in color coded text, where the color codes convey identifying information about the matching attributes. Persons of ordinary skill in the relevant art will understand that other methods may be used to report objects associated with matching attributes. For example, an audio report may be provided that describes each matching object and its matching attributes. All such alternative methods are included within the scope and spirit of this invention.

Persons of ordinary skill in the relevant art will understand that methods and apparatus in accordance with this invention may be used to facilitate setting print options when submitting a print job via a printer driver, distiller, or other similar application. For example, methods and apparatus in accordance with this invention may be used to determine the attributes of each object in a PDL File, and then specify print options accordingly. Such techniques may be used prior to obtaining a printed copy of a print job, or after a copy has been printed.

Persons of ordinary skill in the art will further understand that methods in accordance with this invention may be implemented as a computer software product for use with a computer system. The programs of the software product define the functions of the exemplary embodiments and may be delivered to a computer via a variety of signal-bearing media, which include, but are not limited to: (a) information permanently stored on non-writable storage media (e.g., read-only memory devices within a computer such as CD-ROM disks readable by CD-ROM drive); (b) alterable information stored on writable storage media (e.g., floppy disks within diskette drive or hard-disk drive); or (c) information conveyed to a computer by a communications medium, such as through a computer or telephone network, including wireless communications. Such signal-bearing media, when carrying computer-readable instructions that direct the functions of the present invention, represent alternative embodiments of this invention.

Persons of ordinary skill in the art further will recognize that methods and apparatus in accordance with this invention may be implemented using steps or devices other than those shown and discussed above. All such modifications are within the scope of the present invention, which is limited only by the claims that follow.

The invention claimed is:

1. A method implemented by a computer comprising a processor and a memory, the processor configured to implement instructions stored in the memory for analyzing a print job comprising a plurality of graphics, each graphic having at least one associated color-space definition, the method comprising:

configuring at least one user computer in a printing environment, wherein said computer includes an audio output;

determining, by the computer, a color-space schema;

associating, by the computer, a corresponding auditory sound with each color-space schema;

receiving, by the computer PostScript commands that describe the graphics included in the print job;

interpreting, by the computer, the PostScript commands to process each graphic in the print job and the at least one associated color-space definition;

reporting, by the computer, the color-space schema not present in said printing environment, wherein the color-space schema comprises a device-dependent color space schema;

determining, by the computer, if said graphic's color-space definition matches said color-space schema not present in said printing environment; and reporting, by the computer, the results of any graphic with the associated color-space definition that matches any color-space schema not present in said printing environment by transmitting said auditory sound via said audio output.

2. The method of claim 1, wherein the graphic's color-space definition comprises a red, green, blue color value.

3. The method of claim 1, wherein the graphic's color-space definition comprises a cyan, magenta, yellow color value.

4. The method of claim 1, wherein the graphic's color-space definition comprises a spot color value.

* * * * *